United States Patent
Schwarz et al.

[11] Patent Number: 5,529,170
[45] Date of Patent: Jun. 25, 1996

[54] FEED SCREW FOR SEDIMENTATION OR TREATMENT SYSTEMS

[75] Inventors: Michael Schwarz, Heidenheim, Germany; Helmut Pfeifhofer, Sydney, Australia

[73] Assignee: Voith Sulzer Stoffaufbereitung GmbH, Ravensburg, Germany

[21] Appl. No.: 375,858

[22] Filed: Jan. 20, 1995

[30] Foreign Application Priority Data

Jan. 22, 1994 [DE] Germany ............... 44 01 840.1

[51] Int. Cl.⁶ ..................................... B65G 33/26
[52] U.S. Cl. ........................... 198/676; 198/662
[58] Field of Search .................. 198/657, 659, 198/662, 676

[56] References Cited

U.S. PATENT DOCUMENTS

| | | | |
|---|---|---|---|
| 2,414,536 | 1/1947 | Kirk | 198/676 X |
| 3,812,956 | 5/1974 | Hindermann | 198/662 X |
| 5,092,453 | 3/1992 | Bruke | 198/676 X |
| 5,337,658 | 8/1994 | Bruke | 198/676 x |

FOREIGN PATENT DOCUMENTS

| | | | |
|---|---|---|---|
| 1970962 | 10/1967 | Germany . | |
| 2628015 | 1/1977 | Germany . | |
| 2830491 | 2/1979 | Germany | 198/662 |
| 4000150A1 | 7/1991 | Germany . | |
| 0352621 | 4/1961 | Switzerland | 198/659 |
| 1234313 | 5/1986 | U.S.S.R. | 198/662 |

*Primary Examiner*—James R. Bidwell
*Attorney, Agent, or Firm*—Baker & Daniels

[57] ABSTRACT

The invention concerns a feed screw in the form of a self-supporting, axleless helix whose surface extends essentially radially, the feed screw being used in sedimentation or treatment systems for clearing suspensions in paper making processes. The invention is characterized by a second helix whose surface, or generatrix, deviates preferably between 0° and 20° from the direction of the central axis and extends in the feed direction. The second helix may deviate between 0° and maximally 40° and have a length—per lead—between 20% and 40% of the lead of the helices.

9 Claims, 1 Drawing Sheet

FEED SCREW FOR SEDIMENTATION OR TREATMENT SYSTEMS

BACKGROUND OF THE INVENTION

The invention concerns a feed screw for use in sedimentation or treatment systems for clearing suspensions in the paper making industry.

Screws of this type are often in the form of a self-supporting helix, the surface of which extends generally axially. A feed screw is known from DE-A 40 00 150; however, this feed screw is not axleless, but apparently has a shaft through which the helix is driven by a motor.

Treatment systems or sedimentation systems for fiber suspensions, for instance used for recycled paper, involve the risk of accumulations bunching up on the helix due to the existence of long contaminants, such as ribbons, strings, etc.

The problem underlying the invention is to boost the productive output of such a system considerably when a helix without a support axle is used as a feed screw. Such a feed screw has a relatively large clearance in the central area, so as to insure a flawless feeding over long operating periods.

SUMMARY OF THE INVENTION

This problem is solved by the present invention wherein there is provided a second helix, the surface of which deviates from 0° to 40° from the central axis of the helix and extends at a length of between 20% and 40% of the lead.

BRIEF DESCRIPTION OF THE DRAWINGS

The invention will be explained hereafter with the aid of the drawing figures, wherein.

Corresponding reference characters indicate corresponding parts throughout the several views. The exemplification set out herein illustrates one preferred embodiment of the invention and such exemplification is not to be construed as limiting the scope of the invention in any manner.

DETAILED DESCRIPTION

Figure 1:
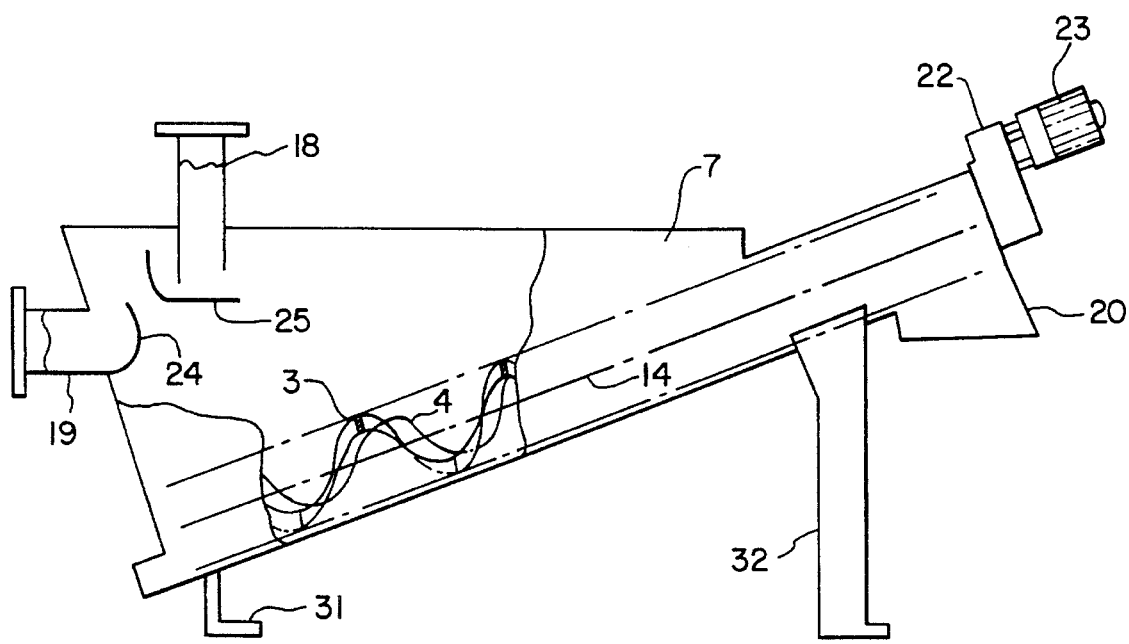
FIG. 1 is an elevation, partly in section, of a sedimentation tank and a section of the feed screw according to the invention.
Figure 2:
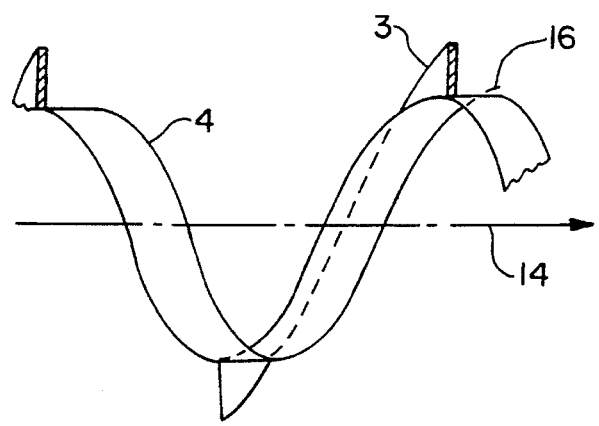
FIG. 2 is a fragmentary view of the feed screw shown partly in section.

The sedimentation system has a cross-sectionally triangular tank 7 with an inlet 18 and a clear water drain 19. Baffles 24 and 25 are provided to generate a specific flow in the tank. Located at the bottom of tank 7 is a feed screw in the form of an axleless helix 3 with an approximately 20° upward orientation. The screw is driven by a motor 23 via a gearbox 22. A removal chute 20 is provided at the end of the feed screw, and the entire system is held by legs 31 and 32. The axleless helix 3 now is supplemented by a second helix 4 which is arranged on the inside edge of the first feed helix 3 and extends from the inside edge in feed direction 14, which direction loosely coincides with the central axis of the helices 3 and 4. Helices 3 and 4 consist of flat strips of plain sheet metal and are joined by welding. This also explains the makeup to the effect that the generatrix 16 of the second helix 4 extends substantially parallel to the feed direction or central axis 14 of the helices.

It is quite possible also for the generatrix of the second helix 4 to have a certain inclination relative to the central axis 14 (up to about 30°), but the manufacture of such a helix is unjustifiably expensive, since the necessary basic materials are not as available as sheet metal and can be fabricated only at high expense. The central clearance of the feed screw ranges generally between 20% and 70% of the outside diameter of the first helix 3, and the second helix 4 extends at a length of between 20% and 40% of the lead (pitch length) of the helices. The stated design achieves an increase in throughput of the feed screw, and thus of the entire sedimentation tank, to nearly twice that when only helix 3 is used.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feed screw comprising:
   a first self-supporting axleless helix defining a central axis, said first helix having a helical surface extending generally radially; and
   a second helix secured to said first helix, said second helix having a helical surface deviating between 0° and 40° from said central axis.

2. The feed screw according to claim 1 wherein said second helix comprises a flat metal strip.

3. The feed screw of claim 2 wherein said first helix comprises a flat metal strip.

4. The feed screw according to claim 2 wherein said second helix is arranged on an inside edge of the first helix and extends from said edge in a feed direction.

5. The feed screw according to claim 1 wherein said second helix is arranged on an inside edge of the first helix and extends from said edge in a feed direction.

6. The feed screw according to claim 1, wherein said feed screw is arranged at the bottom of one of a sedimentation tank and a treatment tank and has an upward orientation between 15° and 50° relative to the horizontal.

7. The feed screw according to claim 1 wherein the helical surface of the second helix extends in an orientation between 0° and 20° from the central axis.

8. The feed screw according to claim 4 wherein the helical surface of the second helix extends in an orientation between 0° and 20° from the central axis.

9. The feed screw according to claim 1 wherein the helical surface of said second helix extends at a length of between 20% and 40% of the lead of the first helix.

* * * * *